United States Patent
Chang

(10) Patent No.: US 6,259,371 B1
(45) Date of Patent: Jul. 10, 2001

(54) POWER SURGE DETECTION DEVICE

(75) Inventor: Nai-Shung Chang, Yung-Ho (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/200,175

(22) Filed: Nov. 25, 1998

(30) Foreign Application Priority Data

Jul. 31, 1998 (TW) .................................................. 87112613

(51) Int. Cl.$^7$ .................................................. G08B 21/00
(52) U.S. Cl. .......................... 340/659; 340/660; 340/661; 340/662; 361/91
(58) Field of Search .................................. 340/659, 660, 340/635, 642, 661, 662, 657; 361/56, 91, 111, 118, 119

(56) References Cited

U.S. PATENT DOCUMENTS

| | | | |
|---|---|---|---|
| 4,879,625 | * 11/1989 | Potenzone | 340/661 |
| 5,166,854 | * 11/1992 | Morishige | 361/91 |
| 5,440,441 | * 8/1995 | Ahuja | 361/62 |
| 5,790,359 | * 8/1998 | Kapp | 361/106 |
| 5,959,537 | * 9/1999 | Banting | 340/664 |
| 6,031,705 | * 2/2000 | Gscheidle | 361/111 |
| 6,107,981 | * 8/2000 | Fujita | 345/95 |
| 6,112,136 | * 8/2000 | Paul | 700/293 |

* cited by examiner

*Primary Examiner*—Jeffery Hofsass
*Assistant Examiner*—Anh La
(74) *Attorney, Agent, or Firm*—Jiawei Huang; J.C. Patents

(57) ABSTRACT

A power surge detection device is disclosed to investigate if there is any power surge occurring to a main processor in a computer system. When the width or frequency of power surges detected jeopardize the normal operation of the computer system, an alerting signal, for example, an interrupt signal or a power management signal, is sent to the main processor to intervene in the normal operation of the computer system so as to avoid the power instability period.

43 Claims, 5 Drawing Sheets

POWER SURGE DETECTION DEVICE

CROSS-REFERENCE TO RELATED APPLICATION

This application claims the priority benefit of Taiwan application serial no. 87112613, filed Jul. 31, 1998, the full disclosure of which is incorporated herein by reference.

BACKGROUND OF THE INVENTION

1. Field of Invention

The present invention generally relates to a power surge detection device, and more particularly to a device for detecting power surges occurring in a computer system.

2. Description of Related Art

A power supply is an essential component in electrical equipment to provide the required power source. Computer systems are no exception. However, the reliability of a power source required by different electrical equipment can be quite different. A computer system typically requires a higher reliability from the power source so as to avoid data loss, calculation errors, or even system failures.

So far, emphasis on a power supply of a computer system is mainly on the following items:

1. The operating efficiency of the power supply:
    A switching power supply is generally adopted in a computer system. Therefore, the load factor is maintained at a ratio of about 75%~85% to prevent overloading to the power supply itself.
2. Overload voltage protection:
    When the output voltage exceeds the rated voltage by 10%, the power supply is turned off to protect the circuit from being damaged.
3. Overload current protection:
    When the output current exceeds the rated current by 10%, the power supply is turned off to protect the circuit from being damaged and prevent further damages due to a short circuit from external circuits.

The power supply currently used in a computer system emphasizes on the above-mentioned protections. Generally, there is no power surge protection built within a computer system.

Power surges occur in many ways from, for example, lightning in the sky, or an operating machine that consumes large power. In the past, the computer can generally tolerate a poorer reliability from the power supply, because the operating speed and frequency are relatively low and the input/output voltages are relatively high. However, the operating speed of computers of the present generation has significantly increased. A central processing unit (CPU) has had an operating frequency up to several hundred MHz. With a pipe line computation, it can execute an instruction per one clock cycle. For example, the Pentium II CPU from INTEL, which adopts a specification of guning transceiver logic (GTL) PLUS bus, has a signal variation ranges from 0~1.5 volt. The threshold voltages for high and low levels are 1.0±200 mV. As a result, the computer system allows only a relatively small range for voltage variation. A power surge to the computer system will significantly affect the input/output signals. Also, since the pipe line of the CPU is well designed, almost an instruction is executed for every clock cycle, which means data are continuously transmitted for every clock cycle. The power surge occurred not only damages the data transmitted from or to the CPU, but also causes data losses, calculation errors, or even system failures.

From the above-mentioned descriptions, it is understood that there is a deficiency in detecting a power surge in a conventional computer system to provide a stable power source required by the computer system that allows only a relatively small range for voltage variation. When a power surge occurs, data losses, calculation errors, or even system failures might occur to the computer system.

SUMMARY OF THE INVENTION

It is therefore an objective of the present invention to provide a power surge detection device to examine if there is any power surge occurring in the power supply to a main processor of a computer system. When the width or frequency of power surges detected jeopardize the normal operation of the computer system, an alerting signal, for example, an interrupt signal or a power management signal, is sent to the main processor to intervene in the normal operation of the computer system so as to avoid the power instability period.

In accordance with the foregoing and other objectives of the present invention, a power surge detection device to detect power surges from a power source is provided, in which a control circuit, a high-speed voltage detection circuit, and a counter are included. The control circuit is responsible for monitoring operations of the power surge detection device. The high-speed voltage detection circuit receives a voltage-controlled signal provided by the control circuit, based on which a detection signal is generated and sent to the counter when a power surge occurs. The counter enumerates the times that power surges have occurred, and sends statistical results to the control circuit.

According to a preferred embodiment of the present invention, the power surge detection device further comprises a main processor interface, which serves as an interface to facilitate the communication between the control circuit and the main processor. The main processor interface can be an integrated circuit bus ($I^2C$ bus) interface, a system management bus (SMBUS), or an internal register. The power surge detection device further comprises an alerting signal generator coupled to the control circuit. When the counter reaches a preset value, the control circuit issues a command requesting the alerting signal generator to send an alerting signal to the main processor. The alerting signal can be an interrupt signal or a power management signal. The preset value can be set into the control circuit by the main processor via the main processor interface.

The high-speed voltage detection circuit comprises a comparator, a reference voltage generator, and a control gate. The comparator comprises two inputs connected to a reference voltage and a power source, and an output for generating a comparison signal. If the power source has a voltage larger than the reference voltage, the comparison signal from the comparator activates. Different reference voltages can be obtained by controlling the voltage selection control signal. Comparison signal from the comparator between the reference voltage and the power source is connected to a control gate, which outputs a detection signal when the clock is also activated. The control gate can be a AND gate.

The above-mentioned reference voltage generator comprises a voltage generation circuit and a voltage selection circuit. The voltage generation circuit generates a plurality of different output voltages, from which a reference voltage is chosen through the control of the voltage selection circuit. The voltage selection circuit comprises a plurality of switches and a decoder. The inputs of the switch are connected to the voltage outputs from the voltage generation circuit and the outputs of the switches are connected together to provide a reference voltage. The decoder is used to decode the voltage selection control signal into a plurality of switch control signals to control the switches, respectively. Only one switch control signal is activated at one time to turn on a switch.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
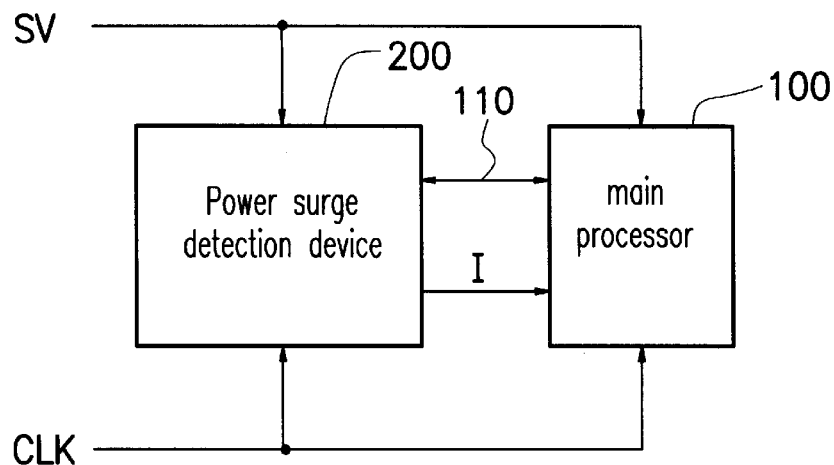
FIG. 1 is a block diagrammatic representation of a computer system including a power surge detection device according to a preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, a block diagrammatic representation of a computer system including a power surge detection device is depicted, including a main processor 100 and a power surge detection device 200. A power source SV is connected to the main processor 100 to provide the operating power source required. A clock signal CLK is connected to the main processor 100 to time and synchronize internal operations in the computer system. The main processor 100 includes a central processing processor (CPU) and CPU-related control circuits. For example, in a widely used personal computer, the CPU communicates with other devices through a chipset. Therefore, a single block including the CPU and its related control circuits is used to facilitate the following discussions of the present invention.

The power surge detection device 200 is used to investigate the effects of voltage variations from the power source SV, such as number of times that power surges occurred. The power surge detection device 200 communicates with the main processor 100 through a connection 110, including receiving an instruction from the main processor 100 and sending data to the main processor 100. Note that the main processor 100 is sensitive to power surges, particularly when the main processor 100 is accessing data. Also, operations of the main processor 100 are synchronized with the power surge detection device 200 by the clock signal CLK. Therefore, power surges are detected based on the clock signal CLK. When a power surge up to a certain level, for example, a width large enough to jeopardize the normal operation of the main processor 100, is detected, the power surge detection device 200 sends an alerting signal I to the main processor 100, for example, an interrupt signal or a power management signal, so that appropriate actions, such as sending a power save mode enabling signal to temporarily halt the main processor 100, can be taken.

Figure 2:
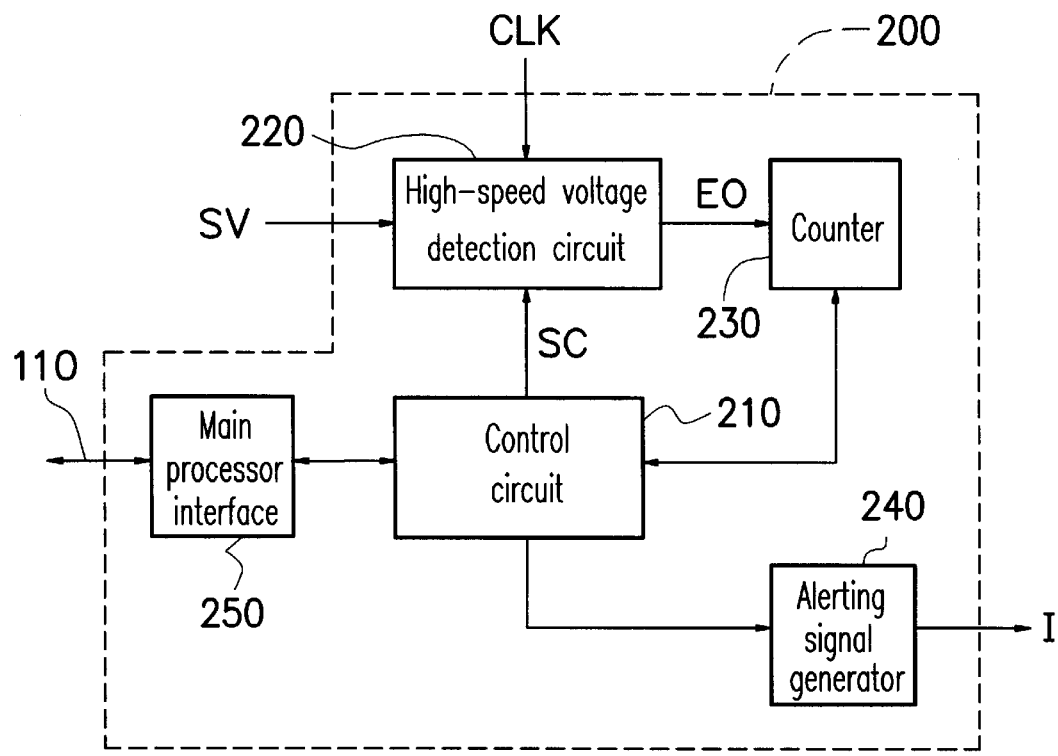
FIG. 2 is a functional block diagram of the power surge detection device of FIG. 1.

With reference to FIG. 2, a functional block diagram of the power surge detection device 200 of FIG. 1 is depicted, including a control circuit 210, a high-speed voltage detection circuit 220, a counter 230, an alerting signal generator 240, and a main processor interface 250. The control circuit 210 is responsible for monitoring the operation of the power surge detection device 200. The high-speed detection circuit 220, controlled by the control circuit 210, is used to detect power surges from the power source SV, and output a detection signal EO to the counter 230 when a power surge occurs. The detection signal EO generated by the high-speed voltage detection circuit 220 activates only when the clock signal CLK is activated and a power surge from the power source SV is occurring.

The counter 230 is used to enumerate the number of times that the detection signal EO is activated, i.e., the number of times that power surge has occurred from the power source SV. The result stored in the counter 230 can be accessed by the control circuit 210, through which the main processor 100 can inquire the current status of power surge from the counter 230. The main processor 100 can also issue a command to the control circuit 210 reset the counter 230 to start a fresh counting.

A main processor interface 250, for example, an integrated circuit bus ($I^2C$ bus), a system management bus (SMBUS), or an internal register, is used to communicate between the control circuit 210 and the main processor 100. An alerting signal generator 240 connected to the control circuit 210 sends an alerting signal I to the main processor 100 when the counter 230 reaches a preset value, so that the main processor 100 can take appropriate actions. For example, when power surges occurs frequently within a certain period, the main processor 100 informed by the alerting signal generator 240 can be temporarily stopped to avoid abnormal operation and data losses. When the power source SV is back to normal, operations can then be resumed. The alerting signal generator 240 generates various alerting signals, for example, an interrupt signal, a non-maskable interrupt (NMI), or a power management signal, to the main processor 100, depending on functions required. Also, the preset value for generating an alerting signal can be set into the control circuit 210 by the main processor 100 through the main processor interface 250.

Figure 3:
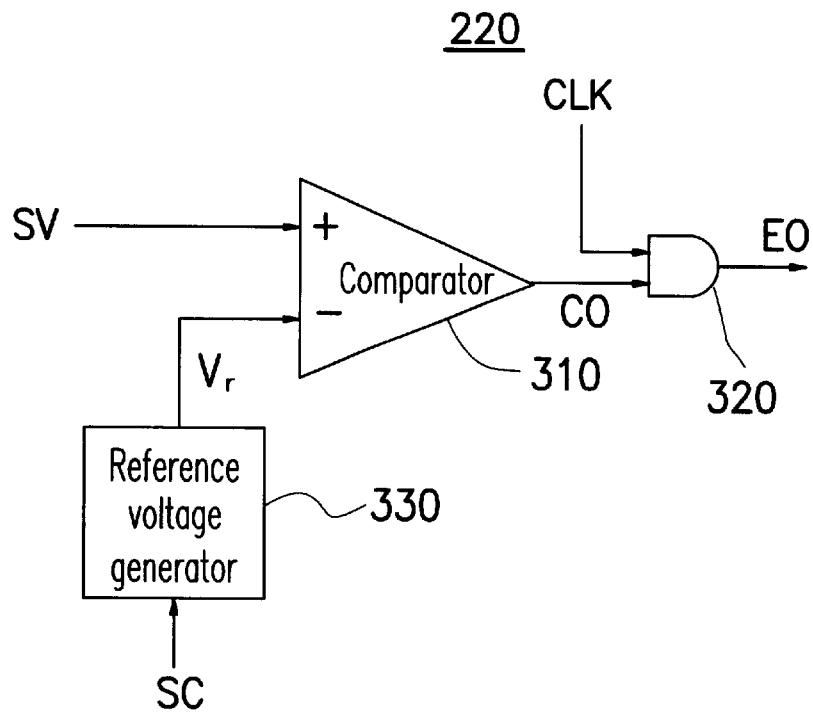
FIG. 3 is a block diagram of the high-speed voltage detection circuit of FIG. 2.

With reference to FIG. 3, a block diagram of the high-speed voltage detection circuit of FIG. 2 is depicted, including a comparator 310, a control gate 320, and a reference voltage generator 330. The reference voltage generator 330 controlled by a voltage selection control signal SC is used to generate a reference voltage $V_r$ suitable for measuring a power surge from the power source SV and adaptable to different levels of voltage variation. The reference voltage $V_r$ is provided by the reference voltage generator 330 in FIG. 3, however, it can also be provided by an external voltage source. The comparator 310 has two inputs for receiving signals from both the power source SV and the reference voltage $V_r$. A comparison signal CO is activated when the voltage of the power source SV is larger than the reference voltage $V_r$. That is, when the "+" input is higher than the "−" input of the comparator 310, the comparing result CO from the comparator 310 is activated at, for example, a high potential level. A high-speed operational amplifier can be adopted as the comparator 310, so that a transient power surge can be captured. The comparison signal EO from the comparator 310 is connected to a control gate 320, for example, an AND gate. As shown in FIG. 3, the comparison signal CO and a clock signal CLK are connected to the inputs of the AND gate 320, and a detection signal EO is obtained from the output of the AND gate 320. The detection signal EO is HIGH only if the comparison signal CO and the clock CLK are all HIGH.

Figure 4:
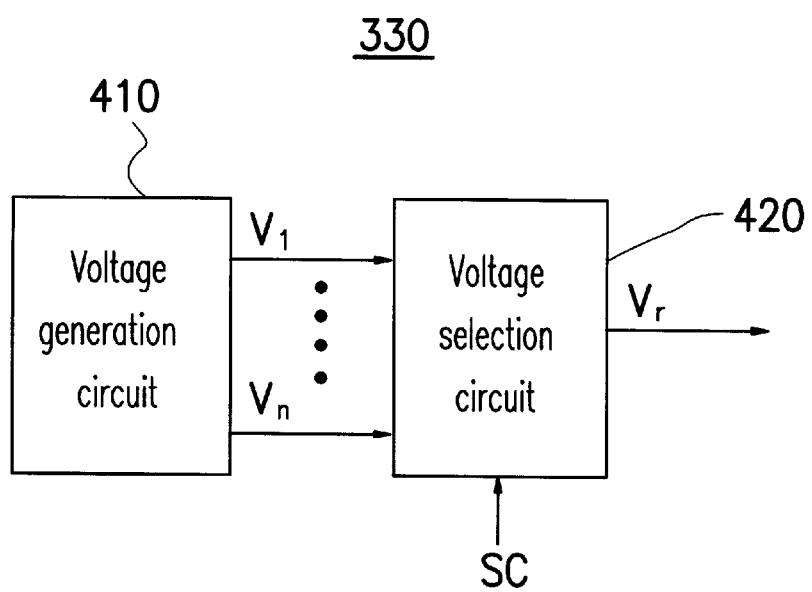
FIG. 4 is a block diagram of the reference voltage generator of FIG. 3.

With reference to FIG. 4, a block diagram of the reference voltage generator 330 of FIG. 3 is shown, including a voltage generation circuit 410 and a voltage selection circuit 420. The voltage generation circuit 410 generates a plurality of different output voltages $V_1 \sim V_N$ connecting to inputs of the voltage selection circuit 420. The voltage selection circuit 420 controlled by a voltage selection control signal SC to choose a reference voltage $V_r$ among the output voltages $V_1 \sim V_N$.

Figure 5:
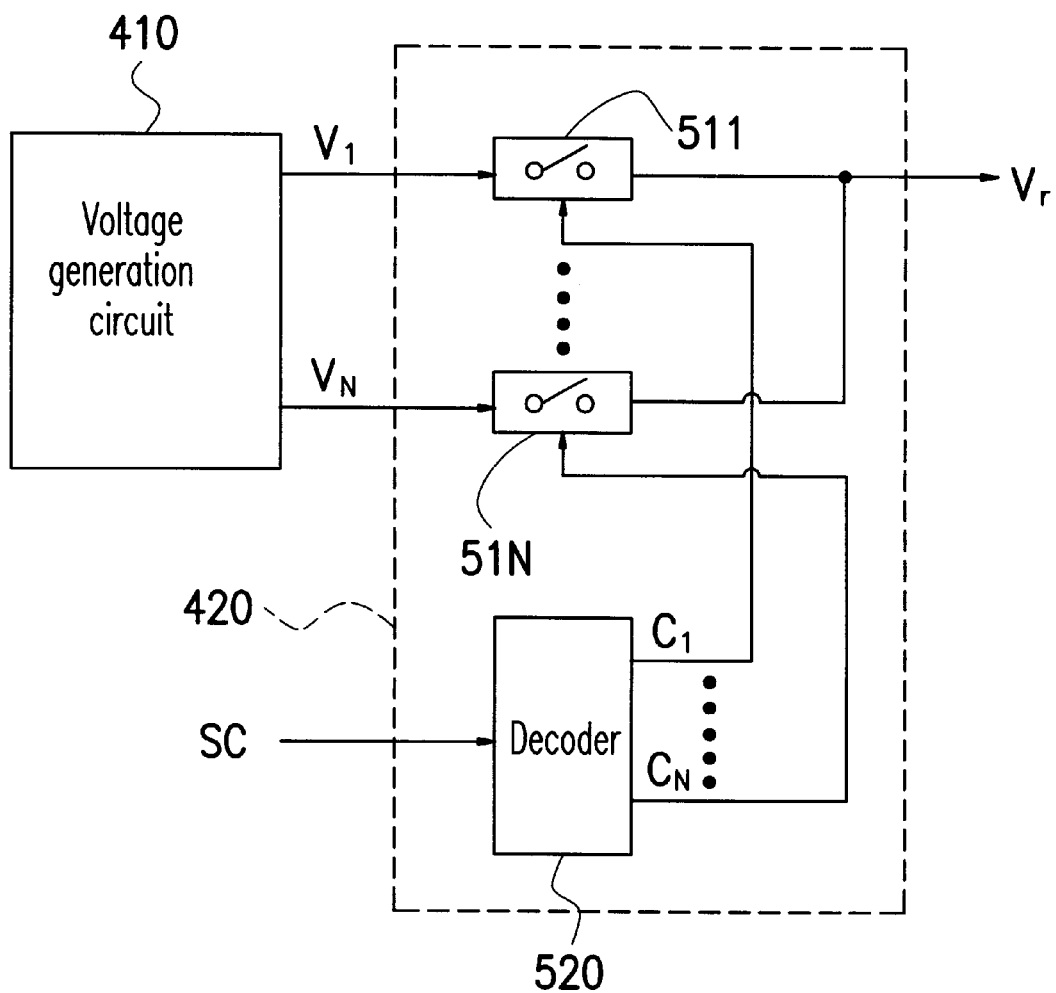
FIG. 5 is a block diagram of the voltage selection circuit of FIG. 4.

With reference to FIG. 5, a block diagram of the voltage selection circuit 420 of FIG. 4 is shown. The voltage selection circuit 420 comprises a plurality of switches 511~51N and a decoder 520. Inputs of the switches 511~51N are connected to the output voltages $V_{1 \sim VN}$ from the voltage generation circuit, respectively, while outputs of the switches 511~51N are connected together to provide a reference voltage $V_r$. The switches 511~51N comprise electronic switches, for example, field-effect transistors (FET). The decoder 520 decodes the voltage selection control signal SC into a plurality of switch control signals $C_{1 \sim CN}$ to control switches 511~51N, respectively. When one of the switch control signals $C_1 \sim C_N$ is activated, the corresponding switch is ON. There is only one switch control signal activated at one time. That is, only one of the switches 511~51N is ON, implying only one of the output voltages $V_1 \sim V_N$ is selected by the voltage selection control signal SC to provide a reference voltage $V_r$.

From the above-mentioned descriptions, it is understood that the main processor 100 can reset the counter 230 and set a preset value for generating an alerting signal by issuing a command and parameters to the control circuit 210 through the main processor interface 250. Subsequently, the high-speed voltage detection circuit 220 is used to detect power surges from the power source SV. When there is a power surge from the power source SV and the clock signal CLK is activated, the detection signal EO is activated so that the counter value is increased by 1. When the counter 230 reaches the preset value, which implies the effects of the power surges have reached a level which jeopardizes the normal operation of the main processor 100, the control circuit 210 will instruct the alerting signal generator 240 to issue an alerting signal I, for example, an interrupt signal or power management signal, to the main processor 100 to interrupt the operation of the main processor 100. The main processor 100 can also inquire the current status of the power surges occurred from the control circuit 210 through the main processor interface 250. The preset value for generating an alerting signal can also be set into the control circuit 210 in the same way. When the power source SV becomes unstable with many power surges detected, the main processor 100 can reduce the operating frequency to prevent the system from being damaged.

Figure 6:
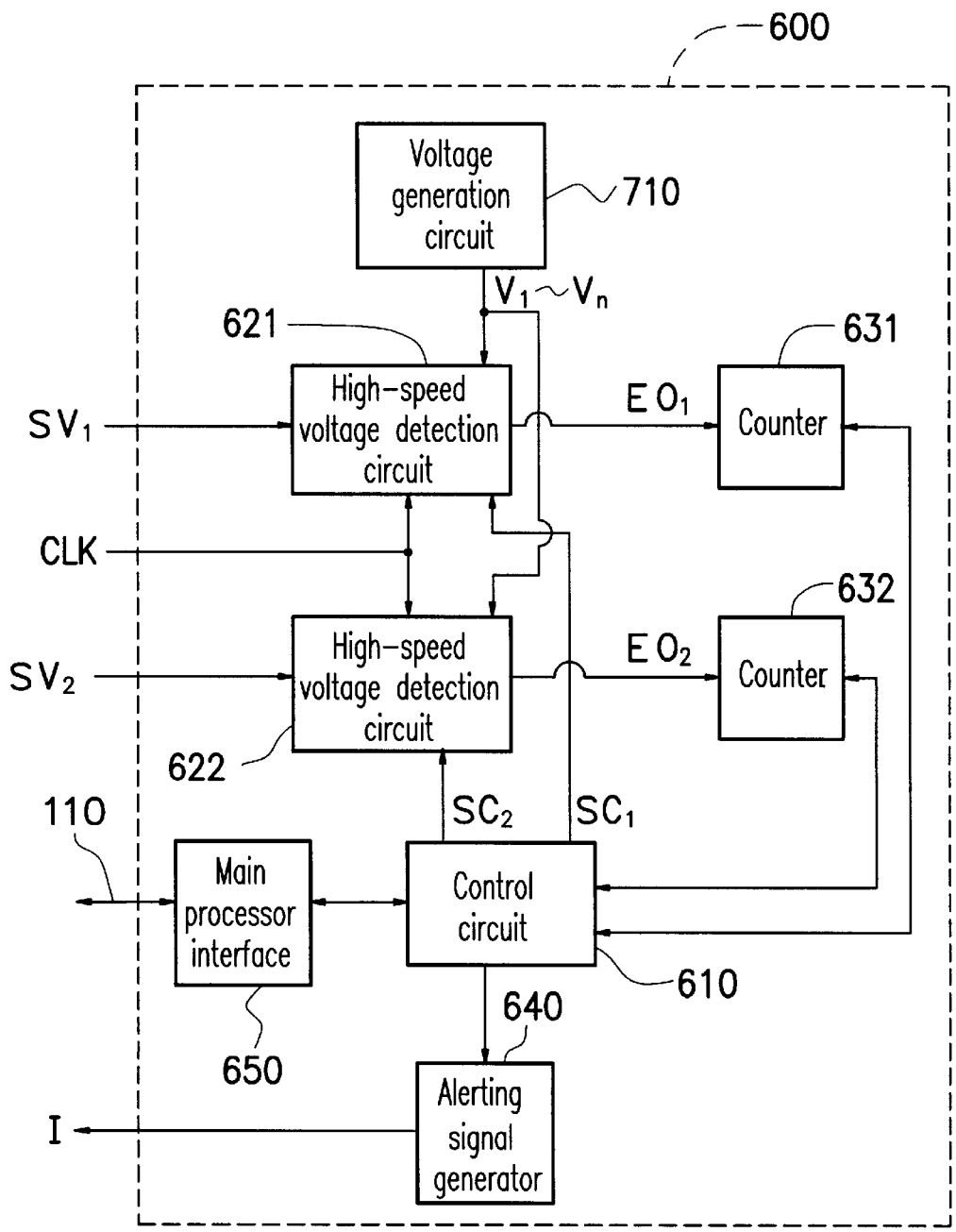
FIG. 6 is a block diagram of a power surge detection device for two power sources.

With reference to FIG. 6, a block diagram of a power surge detection device 600 for two power sources is shown, including a control circuit 610, a voltage generation circuit 710, high-speed voltage detection circuits 621 and 622, counters 631 and 632, an alerting signal generator 640, and a main processor interface 650. Compared with FIG. 2, there are two sets of high-speed voltage detection circuits and counters in the power surge detection device 600 to monitor power sources SV1 and SV2 in FIG. 6. The voltage generation circuit 710 provides output voltages $V_1 \sim V_N$ to the high-speed voltage detection circuits 621 and 622 to generate reference voltages required. The rest of the components in FIG. 6 are functioned almost the same as FIG. 2, and therefore not described hereon.

Figure 7:
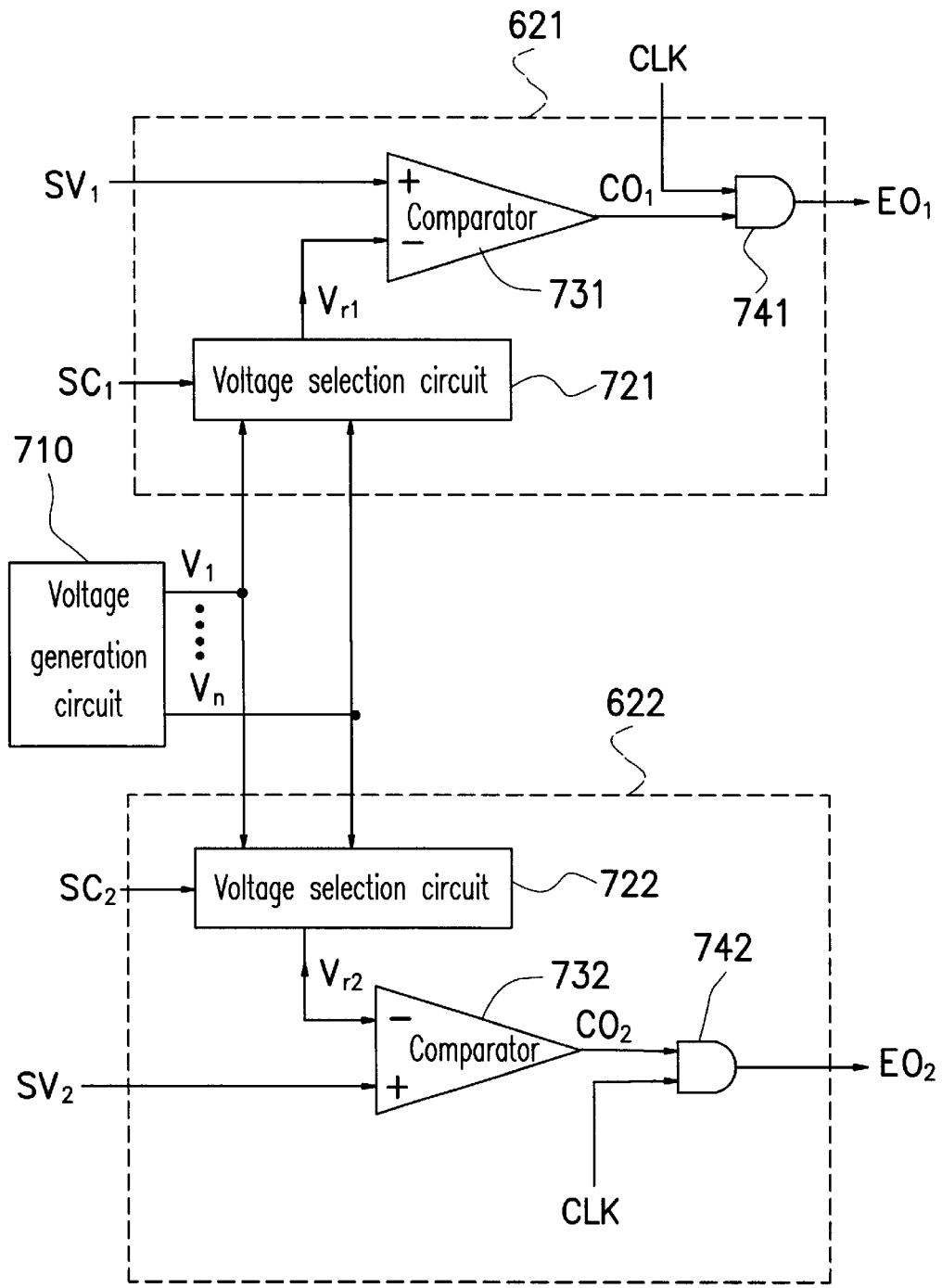
FIG. 7 is a block diagram of the high-speed voltage detection circuit of FIG. 6.

With reference to FIG. 7, a block diagram of the high-speed voltage detection circuits 621 and 622 of FIG. 6 is shown. The high-speed voltage detection circuits 621 and 622 share the same voltage generation circuit 710. The voltage selection control signals SC1 and SC2 are used to control the voltage selection circuits 721 and 722 to obtain the desired reference voltages $V_{r1}$ and $V_{r2}$, respectively. The rest of the components in FIG. 7 are functioned the same as FIG. 3, and are therefore not described hereon.

From the above-mentioned descriptions, a power surge detection device for monitoring multiple power sources can be constructed by including additional high-speed voltage detection circuits and counters. Furthermore, the high-speed voltage detection circuits can share a single voltage generation circuit.

It is understood that the power surge detection device according to the preferred embodiments of the present invention can be used to monitor power surges from the power sources required by the main processor. When the width or frequency of power surges jeopardize the normal operation of the main processor, the device can send an alerting signal to the main processor, for example, an interrupt signal or a power management signal, to interrupt the normal operation of the main processor. The main processor can also inquire the current status of the power source or reset a preset value for generating an alerting signal through the main processor interface. When the power source becomes unstable for a certain period with many power surges detected, the main processor can reduce the operating frequency to prevent the system from being damaged. Therefore, the power surge detection device according to the preferred embodiments of the present invention can avoid data losses and calculation errors in a computer system to maintain a smooth operation for the computer system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power surge detection device for detecting power surges from a power source, comprising:

a power source, external to the power surge detection device, for use with a high frequency device;

a control circuit, responsible for monitoring operations of the power surge detection device;

a high-speed voltage detection circuit controlled by a voltage-controlled signal from the control circuit, wherein a detection signal from the high-speed voltage detection circuit is activated when a power surge from the power source occurs based on the voltage-controlled signal; and a counter connected to both the high-speed voltage detection circuit and the control circuit for enumerating the number of times that power surges have occurred.

2. The power surge detection device of claim 1 further comprises a main processor interface to facilitate the communication between the control circuit and a main processor.

3. The power surge detection device of claim 2, wherein the main processor interface comprises an integrated circuit bus (I²C bus) interface.

4. The power surge detection device of claim 2 further comprises an alerting signal generator connected to the control circuit, wherein when the counter reaches a preset value, the control circuit issues a command requesting the alerting signal generator to generate an alerting signal.

5. The power surge detection device of claim 4, wherein the alerting signal comprises an interrupt signal.

6. The power surge detection device of claim 4, wherein the alerting signal comprises a power management signal.

7. The power surge detection device of claim 4, wherein the preset value is set by the main processor through the main processor interface.

8. The power surge detection device of claim 1, wherein the high-speed voltage detection circuit comprises:

a comparator comprising two inputs connected to a reference voltage and the power source, and an output for generating a comparison signal, wherein the comparison signal from the comparator activates when the voltage of the power source is larger than the reference voltage; and a control gate which receives inputs from the comparison signal and a clock signal, wherein a detection signal from the control gate is activated when the clock signal and the comparison signal are activated.

9. The power surge detection device of claim 8, wherein the reference voltage comprises an external voltage source.

10. The power surge detection device of claim 8, wherein the high-speed voltage detection circuit further comprises a reference voltage generator controlled by the voltage-controlled signal to generate a plurality of different voltages.

11. The power surge detection device of claim 8, wherein the control gate comprises an AND gate having at least two inputs and one output, wherein the comparison signal and the clock signal are connected to the inputs of the AND gate, and the detection signal is obtained from the output of the AND gate, wherein the detection signal is HIGH only if the comparison signal and the clock signal are all HIGH.

12. The power surge detection device of claim 10, wherein the reference voltage generator comprises:

a voltage generation circuit to generate a plurality of different output voltages; and a voltage selection circuit having a plurality of inputs connected to the output voltages from the voltage generation circuit, respectively, wherein the reference voltage is chosen from one of output voltages from the voltage generation circuit by controlling the voltage-controlled signal.

13. The power surge detection device of claim 12, wherein the voltage selection circuit comprises:

a plurality of switches, wherein inputs of the switch are connected to the voltage outputs from the voltage generation circuit and outputs of the switches are connected together to provide the reference voltage; and a decoder to decode the voltage-controlled signal into a plurality of switch control signals to control the switches, wherein only one switch control signal is activated at one time to turn on one switch.

14. The power surge detection device of claim 8, wherein the clock signal is used by the main processor.

15. A power surge detection device for detecting power surges from a power source, comprising:

a power source, external to the power surge detection device, for use with a high frequency device;

a control circuit, responsible for monitoring operations of the power surge detection device;

a high-speed voltage detection circuit controlled by a voltage-controlled signal from the control circuit, wherein a detection signal from the high-speed voltage detection circuit is activated when a power surge from the power source occurs based on the voltage-controlled signal;

a counter connected to both the high-speed voltage detection circuit and the control circuit for enumerating the number of times that power surges have occurred;

a main processor interface to facilitate the communication between the control circuit and a main processor; and an alerting signal generator connected to the control circuit, wherein when the counter reaches a preset value, the control circuit issues a command requesting the alerting signal generator to generate an alerting signal.

16. The power surge detection device of claim 15, wherein the alerting signal comprises an interrupt signal.

17. The power surge detection device of claim 15, wherein the alerting signal comprises a power management signal.

18. The power surge detection device of claim 15, wherein the main processor interface comprises an integrated circuit bus (I²C bus) interface.

19. The power surge detection device of claim 15, wherein the preset value is set by the main processor through the main processor interface.

20. The power surge detection device of claim 15, wherein the high-speed voltage detection circuit comprises:

a comparator comprising two inputs connected to a reference voltage and the power source, and an output for generating a comparison signal, wherein the comparison signal from the comparator activates when the voltage of the power source is larger than the reference voltage; and a control gate which receives inputs from the comparison signal and a clock signal, wherein a detection signal from the control gate is activated when the clock signal and the comparison signal are activated.

21. The power surge detection device of claim 20, wherein the reference voltage comprises an external voltage source.

22. The power surge detection device of claim 20, wherein the high-speed voltage detection circuit further comprises a reference voltage generator controlled by the voltage-controlled signal to generate a plurality of different voltages.

23. The power surge detection device of claim 20, wherein the control gate comprises an AND gate having at least two inputs and one output, wherein the comparison signal and the clock signal are connected to the inputs of the AND gate, and the detection signal is obtained from the output of the AND gate, wherein the detection signal is HIGH only if the comparison signal and the clock signal are all HIGH.

24. The power surge detection device of claim 22, wherein the reference voltage generator comprises:
- a voltage generation circuit to generate a plurality of different output voltages; and
- a voltage selection circuit having a plurality of inputs connected to the output voltages from the voltage generation circuit, respectively, wherein the reference voltage is chosen from one of output voltages from the voltage generation circuit by controlling the voltage-controlled signal.

25. The power surge detection device of claim 24, wherein the voltage selection circuit comprises:
- a plurality of switches, wherein inputs of the switch are connected to the voltage outputs from the voltage generation circuit and outputs of the switches are connected together to provide the reference voltage; and
- a decoder to decode the voltage-controlled signal into a plurality of switch control signals to control the switches, wherein only one switch control signal is activated at one time to turn on one switch.

26. The power surge detection device of claim 20, wherein the clock signal is used by the main processor.

27. A power surge detection device for detecting power surges from a first and a second power source, comprising:
- a first power source and a second power source, external to the power surge detection device, for use with a high frequency device;
- a control circuit, responsible for monitoring operations of the power surge detection device;
- a first high-speed voltage detection circuit controlled by a first voltage-controlled signal from the control circuit, wherein a first detection signal from the first high-speed voltage detection circuit is activated when a power surge occurs from the first power source based on the first voltage-controlled signal;
- a first counter connected to both the first high-speed voltage detection circuit and the control circuit for enumerating the number of times that the first detection signal has activated;
- a second high-speed voltage detection circuit controlled by a second voltage-controlled signal from the control circuit, wherein a second detection signal from the second high-speed voltage detection circuit is activated when a power surge occurs from the second power source based on the second voltage-controlled signal;
- a second counter connected to both the second high-speed voltage detection circuit and the control circuit for enumerating the number of times that the second detection signal has activated;
- a main processor interface to facilitate the communication between the control circuit and a main processor; and
- an alerting signal generator connected to the control circuit, wherein when either the first counter or the second counter reaches a preset value, the control circuit issues a command requesting the alerting signal generator to generate an alerting signal.

28. The power surge detection device of claim 27, wherein the alerting signal comprises an interrupt signal.

29. The power surge detection device of claim 27, wherein the alerting signal comprises a power management signal.

30. The power surge detection device of claim 27, wherein the main processor interface comprises an integrated circuit bus ($I^2C$ bus) interface.

31. The power surge detection device of claim 27, wherein the preset value is set by the main processor through the main processor interface.

32. The power surge detection device of claim 27 further comprises a voltage generation circuit, which generates a plurality of different output voltages connected to the first high-speed voltage detection circuit and the second high-speed voltage detection circuit.

33. The power surge detection device of claim 32, wherein the first high-speed voltage detection circuit and the second high-speed voltage detection circuit detects power surges based on a clock signal.

34. The power surge detection device of claim 33, wherein the first high-speed voltage detection circuit comprises:
- a voltage selection circuit having a plurality of inputs connected to the output voltages from the voltage generation circuit, respectively, wherein a reference voltage is chosen from one of output voltages from the voltage generation circuit by controlling the first voltage-controlled signal
- a comparator comprising two inputs connected to the reference voltage and the first power source, and an output for generating a comparison signal, wherein the comparison signal from the comparator activates when the voltage of the first power source is larger than the reference voltage; and
- a control gate which receives inputs from the comparison signal and the clock signal, wherein a first detection signal from the control gate is activated when the clock signal and the comparison signal are activated.

35. The power surge detection device of claim 34, wherein the control gate comprises an AND gate having at least two inputs and one output, wherein the comparison signal and the clock signal are connected to the inputs of the AND gate, and the detection signal is obtained from the output of the AND gate, wherein the detection signal is HIGH only if the comparison signal and the clock signal are all HIGH.

36. The power surge detection device of claim 33, wherein the second high-speed voltage detection circuit comprises:
- a voltage selection circuit having a plurality of inputs connected to the output voltages from the voltage generation circuit, respectively, wherein a reference voltage is chosen from one of output voltages from the voltage generation circuit by controlling the second voltage-controlled signal
- a comparator comprising two inputs connected to the reference voltage and the second power source, and an output for generating a comparison signal, wherein the comparison signal from the comparator activates when the voltage of the second power source is larger than the reference voltage; and
- a control gate which receives inputs from the comparison signal and the clock signal, wherein a second detection signal from the control gate is activated when the clock signal and the comparison signal are activated.

37. The power surge detection device of claim 36, wherein the control gate comprises an AND gate having at least two inputs and one output, wherein the comparison signal and the clock signal are connected to the inputs of the AND gate, and the detection signal is obtained from the output of the AND gate, wherein the detection signal is HIGH only if the comparison signal and the clock signal are all HIGH.

38. The power surge detection device of claim 37, wherein the clock signal is used by the main processor.

39. A power surge detection device for detecting power surges from a power source, comprising:

a power source, external to the power surge detection device, for use with a high frequency device;

a control circuit, responsible for monitoring operations of the power surge detection device;

a high-speed voltage detection circuit controlled by a voltage-controlled signal from the control circuit, wherein a detection signal from the high-speed voltage detection circuit is activated when a power surge from the power source occurs based on the voltage-controlled signal;

a counter connected to both the high-speed voltage detection circuit and the control circuit for enumerating the number of times that power surges have occurred;

an alerting signal generator connected to the control circuit, wherein when the counter reaches a preset value, the control circuit issues a command requesting the alerting signal generator to generate an alerting signal that comprises an interrupt signal or a power management signal;

a main processor interface to facilitate the communication between the control circuit and a main processor, wherein the preset value is set by the main processor through the main processor interface.

40. The power surge detection device of claim 39, wherein the high-speed voltage detection circuit comprises:

a comparator comprising two inputs connected to a reference voltage and the power source, and an output for generating a comparison signal, wherein the comparison signal from the comparator activates when the voltage of the power source is larger than the reference voltage; and a control gate which receives inputs from the comparison signal and a clock signal, wherein a detection signal from the control gate is activated when the clock signal and the comparison signal are activated.

41. The power surge detection device of claim 39, wherein the high-speed voltage detection circuit further comprises a reference voltage generator controlled by the voltage-controlled signal to generate a plurality of different voltages.

42. The power surge detection device of claim 40, wherein the reference voltage generator comprises:

a voltage generation circuit to generate a plurality of different output voltages; and a voltage selection circuit having a plurality of inputs connected to the output voltages from the voltage generation circuit, respectively, wherein the reference voltage is chosen from one of output voltages from the voltage generation circuit by controlling the voltage-controlled signal.

43. The power surge detection device of claim 42, wherein the voltage selection circuit comprises:

a plurality of switches, wherein inputs of the switch are connected to the voltage outputs from the voltage generation circuit and outputs of the switches are connected together to provide the reference voltage; and a decoder to decode the voltage-controlled signal into a plurality of switch control signals to control the switches, wherein only one switch control signal is activated at one time to turn on one switch.

* * * * *